US011959333B2

(12) United States Patent
Biro et al.

(10) Patent No.: US 11,959,333 B2
(45) Date of Patent: Apr. 16, 2024

(54) LOUVRE WINDOW

(71) Applicant: Alchin Long Group IP Pty Limited, Sydney (AU)

(72) Inventors: Mitchell Biro, Sydney (AU); Jayden Irwin, Sydney (AU); David Winston, Sydney (AU); Niels Verhaar, Sydney (AU)

(73) Assignee: Alchin Long Group IP Pty Limited, Sydney (AU)

( * ) Notice: Subject to any disclaimer, the term of this patent is extended or adjusted under 35 U.S.C. 154(b) by 0 days.

(21) Appl. No.: 17/893,636

(22) Filed: Aug. 23, 2022

(65) Prior Publication Data

US 2023/0062025 A1 Mar. 2, 2023

(30) Foreign Application Priority Data

Aug. 24, 2021 (AU) ................................ 2021221514

(51) Int. Cl.
*E06B 7/094* (2006.01)

(52) U.S. Cl.
CPC .................................... *E06B 7/094* (2013.01)

(58) Field of Classification Search
CPC .......... E06B 7/086; E06B 7/094; E06B 7/084; E06B 7/08
See application file for complete search history.

(56) References Cited

U.S. PATENT DOCUMENTS 6,098,340 A * 8/2000 Francis .................... E06B 7/086 49/74.1
6,810,621 B1 * 11/2004 Ricci ........................ E06B 7/086 49/90.1
2003/0101653 A1 * 6/2003 Biro ........................ E06B 7/086 49/74.1
2006/0272214 A1 * 12/2006 Simonelli ............... E06B 7/086 49/82.1
2017/0314324 A1 * 11/2017 Cirilli ...................... E06B 9/384

FOREIGN PATENT DOCUMENTS

DE 2659741 11/1980

OTHER PUBLICATIONS

Translation of DE2659741 from Espacenet (Year: 1980).*

* cited by examiner

*Primary Examiner* — Janet M Wilkens
*Assistant Examiner* — Susan M. Heschel
(74) *Attorney, Agent, or Firm* — Andrus Intellectual Property Law, LLP

(57) ABSTRACT

A louvre window having: a frame, the frame having a head, a sill and at least two jambs; a drive bar located in one or both of the jambs that is movable by a handle; a plurality of blades located within the frame and connected to the drive bar by a pivot drive connector, such that movement of the drive bar urges the blades to pivot, each blade having: a first windowpane attached to the blade; and a second windowpane attached to the blade, wherein operation of the handle causes movement of the blades between an open position and a closed position, wherein in the open position the first windowpanes are aligned to form a barrier against airflow and the second windowpanes are aligned to form a barrier against airflow and in the closed position the first windowpanes are pivoted out of alignment to allow airflow and the second windowpanes are pivoted out of alignment to allow airflow.

19 Claims, 10 Drawing Sheets

LOUVRE WINDOW

CROSS-REFERENCE TO RELATED APPLICATIONS

This application claims convention priority to Australian Patent Application No. 2021221514, the contents of which are incorporated herein in their entirety by reference thereto.

FIELD

This invention relates to a louvre window.

BACKGROUND

Louvre windows are a known window style known for being able to allow a large volume of airflow without requiring a large amount of clearance on either side of the window for movement of the sash, since the window is divided into individually pivoting windowpanes. However, due to division of the window into windowpanes, the insulation performance of louvre windows is, generally, poor. Attempts have been made to address this issue, such as using double-glazed units, as for example in DE 2659741 A1, however since each windowpanes still has a point of contact with other windowpanes, the insulative properties of the airgap of each unit are often outweighed by the uncertain seal between the units.

SUMMARY

It is an object of the present invention to at least substantially address one or more of the above disadvantages, or at least provide a useful alternative to the above-mentioned louvre windows.

In a first aspect, the present invention provides a louvre window having: a frame, the frame having a head, a sill and at least two jambs; a drive bar located in one or both of the jambs that is movable by a handle; a plurality of blades located within the frame and connected to the drive bar by a pivot drive connector, such that movement of the drive bar urges the blades to pivot, each blade having: a first windowpane attached to the blade; and a second windowpane attached to the blade, wherein operation of the handle causes movement of the blades between an open position and a closed position, wherein in the closed position the first windowpanes are aligned to form a barrier against airflow and the second windowpanes are aligned to form a barrier against airflow and in the open position the first windowpanes are pivoted out of alignment to allow airflow and the second windowpanes are pivoted out of alignment to allow airflow.

Preferably, the drive bar includes a pair of link bars and the pivot drive connector is connected to a respective link bar at opposite sides of the pivot drive connector such that differential translation of the link bars causes pivoting of the pivot drive connector.

Preferably, the link bars each have an upper and a lower recess for each pivot drive connector at an interior edge thereof, and the pivot drive connector has a boss that confirms to one recess, such that when the link bars are differentially translated, the boss releasably snaps into the upper recess of one link bar and the lower recess of the other link bar.

Preferably, the first and second windowpane of each blade are offset in a first direction by a first amount, and wherein the first and second windowpane of each blade are offset in a second direction by a second amount, and wherein the first direction is perpendicular to the second direction and the first amount is greater than the second amount.

Preferably, each blade further includes a cap member between the first and second windowpane.

Preferably, each blade further includes a sliding member mounted to be movable in the second direction and to which the first windowpane is attached, the sliding member having an upper end extending over the first windowpane, and wherein the cap member has a lower end extending below second windowpane such that, when the blades move from the closed position to the open position, the lower end of the cap member of an upper blade abuts the upper end of the sliding member of a lower blade to urge the first windowpane of the lower blade in the second direction.

Preferably, the sliding member further includes a lower end extending toward the lower end of the cap member such that, when the blades move from the open position to the closed position, the upper end of the sliding member of the lower blade abuts the lower end of the sliding member of the upper blade to maintain separation between the second windowpane of the upper blade and the first windowpane of the lower blade.

Preferably, the cap member has an upper end that extends above the second windowpane such that, when the blades move from the open position to the closed position, the upper end of the cap member of the lower blade abuts the lower end of the sliding member of the upper blade to urge the first windowpane of the upper blade opposite the second direction.

Preferably, each blade further includes a slide drive member that pivots together with the pivot drive connector, the slide drive member having a recess that pivots with the slide drive member, and a sliding member mounted to be movable in a first direction parallel to the first windowpane and having a lower end that extends in a second direction normal to the first windowpane as well as a drive boss received by the recess in the slide drive member, wherein, when the blades are driven from the closed position to the open position, the slide drive member pivots and thereby urges the sliding member in the first direction to increase a distance between the first windowpane and the second windowpane.

Preferably, the sliding member is attached to the blade by at least two pivotable arm to allow movement of the sliding member in the second direction, such that the blades are pivotable by about 90 degrees between the closed and the open position.

Preferably, the drive boss of the sliding member includes a roller to reduce friction between the drive boss and the recess of the slide drive member.

Preferably, in the open position, the second windowpane of an upper blade is aligned with the first windowpane of a lower blade to form a channel with substantially uninterrupted walls to promote airflow.

BRIEF DESCRIPTION OF THE DRAWINGS

Preferred embodiments of the present invention will now be described by way of example, with reference to the accompanying drawings, wherein.

DETAILED DESCRIPTION

Figure 1:
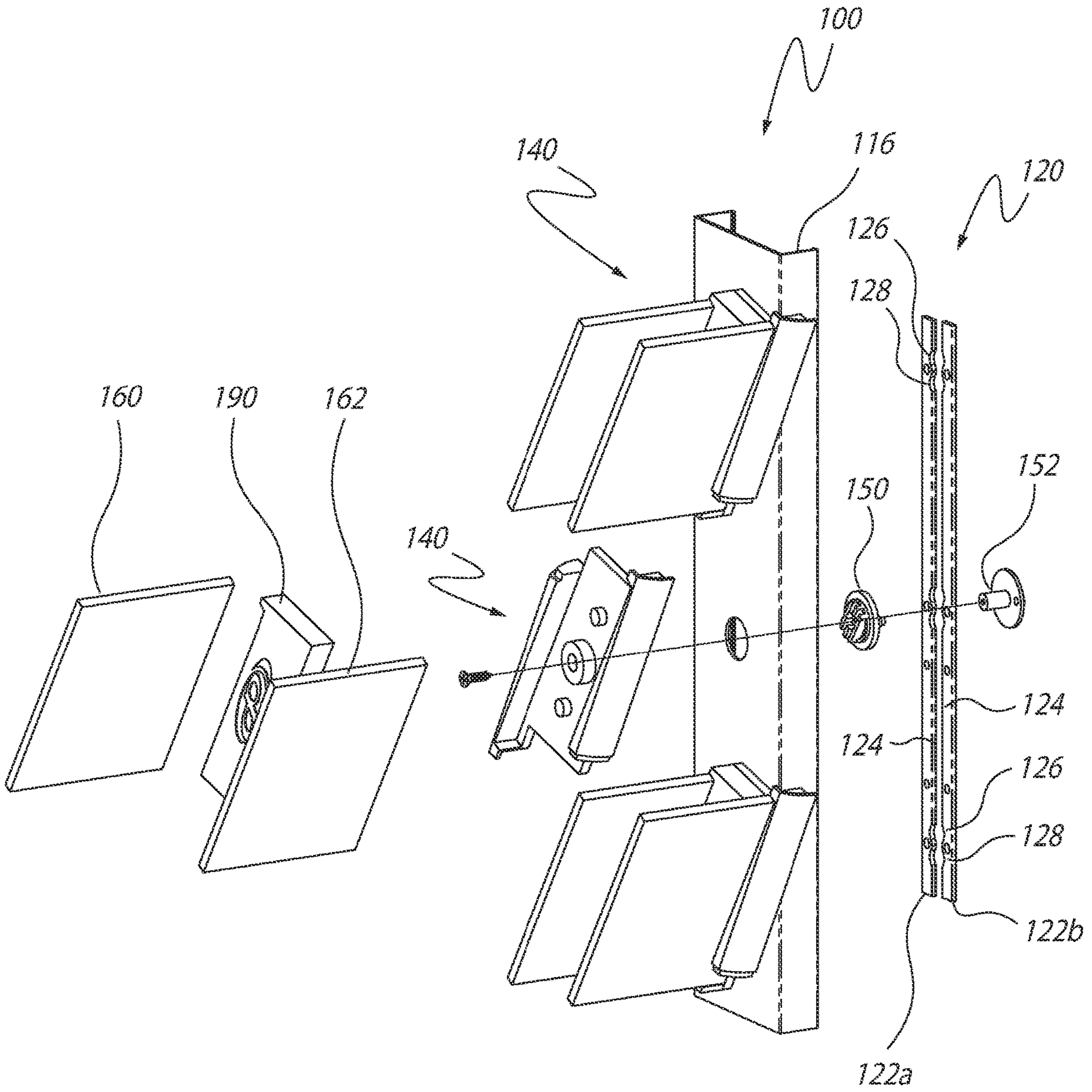
FIG. 1 is a detailed exploded view of a louvre window according to a preferred embodiment of the invention.
Figure 4:
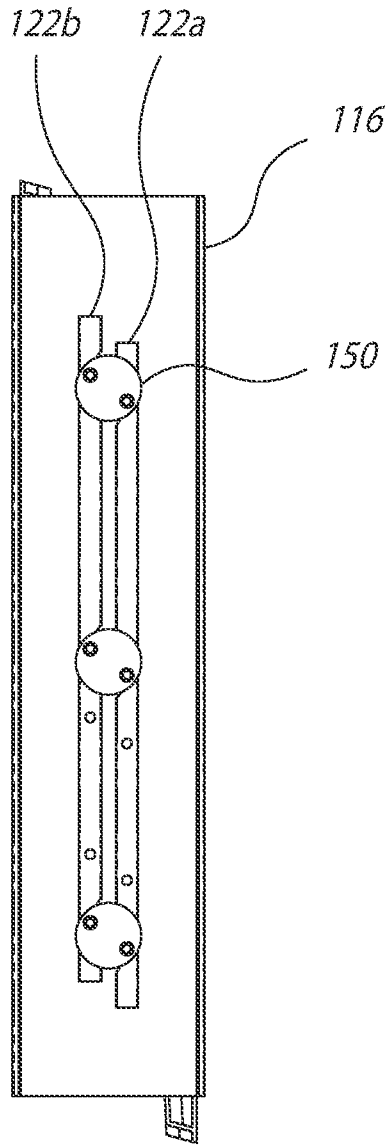
FIG. 4 is a detailed right section view of the louvre window of FIG. 1 in the closed position.
Figure 5:
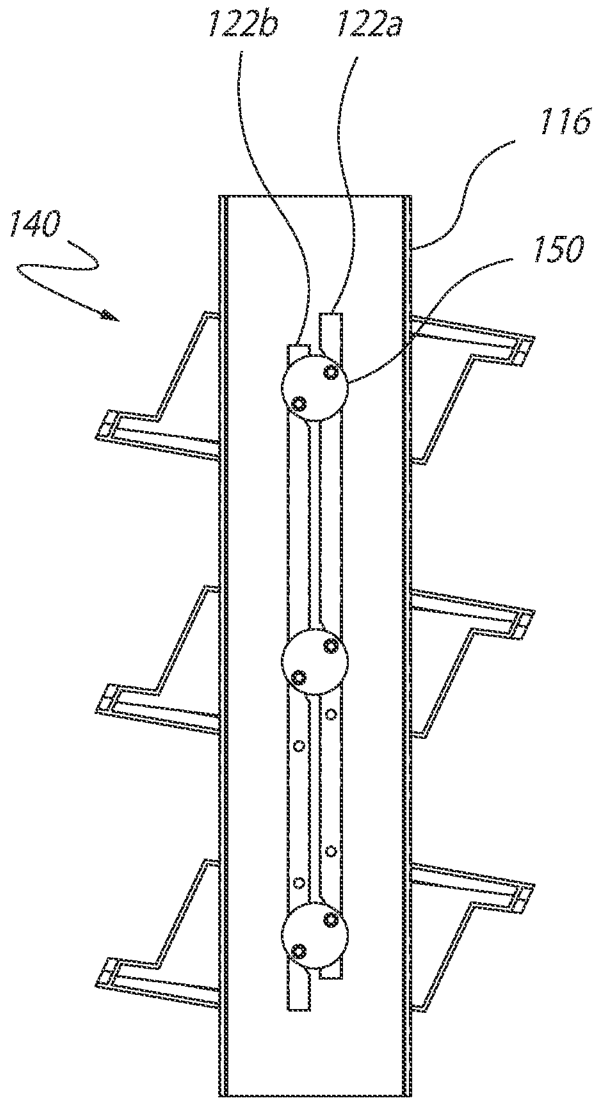
FIG. 5 is a detailed right section view of the louvre window of FIG. 1 in the open position.
Figure 20:
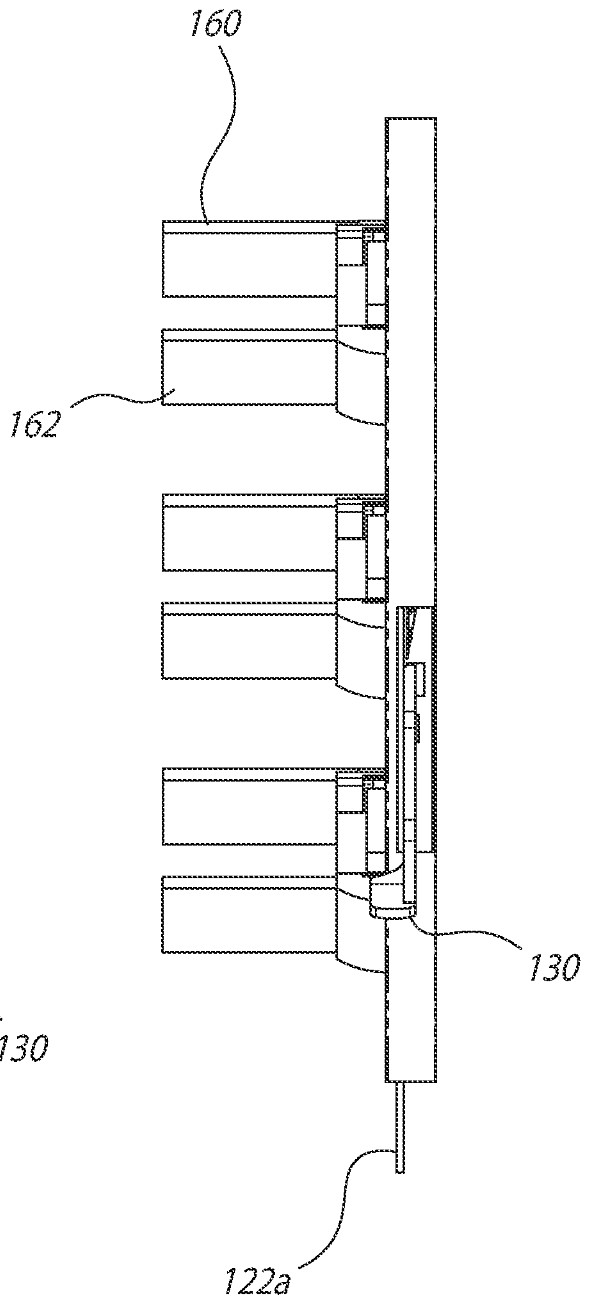
FIG. 20 is a detailed front elevation view of the louvre window of FIG. 16 in the open position.

FIG. 1 shows a detailed view of a louvre window 100 according to a preferred embodiment of the invention. The components of the louvre window 100 shown are part of the louvre window 100 that has a frame 110 with a head 112, a sill 114, and at least two jambs 116. As seen in FIG. 1, the louvre window 100 includes a drive bar 120 located in at least one jamb 116, the drive bar 120 being movable by a handle 130. An example of the handle 130 may be seen in FIGS. 16 and 20. The louvre window 100 further includes a plurality of blades 140 that are located within the frame 110 and connected to the drive bar 120 by a pivot drive connector 150. Preferably, the drive bar 120 includes a pair of link bars 122, with the pivot drive connector 150 being attached to each link bar 122 at opposing sides of the pivot drive connector 150. Thus, when the link bars 122 are moved in opposite directions, the pivot drive connector 150 is urged to pivot, as shown in FIGS. 4 and 5.

Returning to FIG. 1, each link bar 122 has an interior edge 124 with an upper recess 126 as well as a lower recess 128 for each pivot drive connector 150 driven by the drive bar 120. In the closed position shown in FIG. 4, the upper recess 126 of a first link bar 122*a* is located adjacent the lower recess 128 of a second link bar 122*b*. When moved to the closed position shown in FIG. 5, the situation is reversed with the lower recess 128 of the first link bar 122*a* being adjacent the upper recess 126 of the second link bar. Returning to FIG. 1, the pivot drive connector 150 includes a boss 152 that projects towards the link bars 122 and conforms to the recesses 126, 128 such that when the link bars 122 are in the closed position, the boss 152 releasably snaps into the adjacent recesses 126, 128. Similarly, when the link bars 122 are in the open position, the boss 152 releasably snaps into the adjacent recesses 126, 128.

Figure 2:
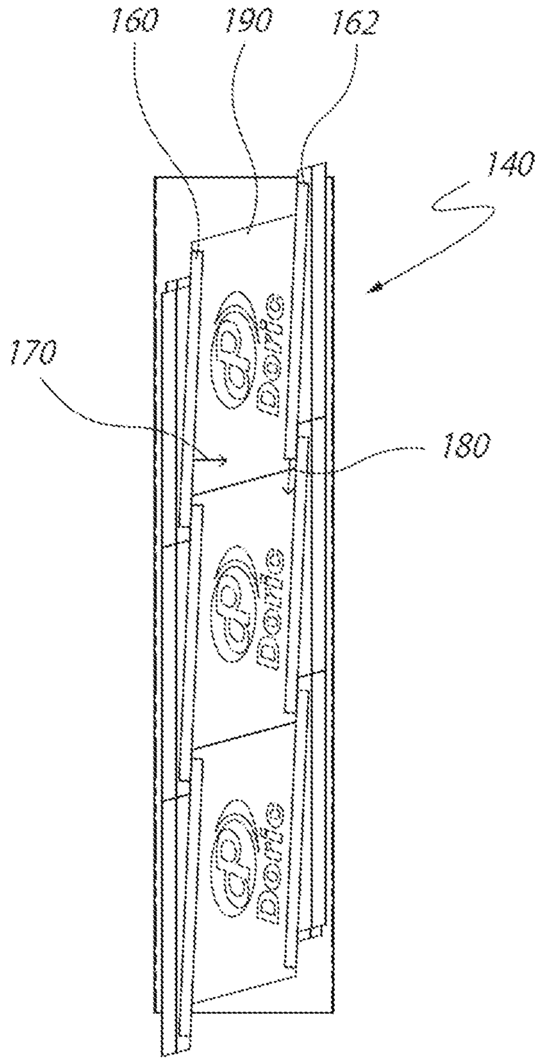
FIG. 2 is a detailed left section view of the louvre window of FIG. 1 in a closed position.
Figure 3:
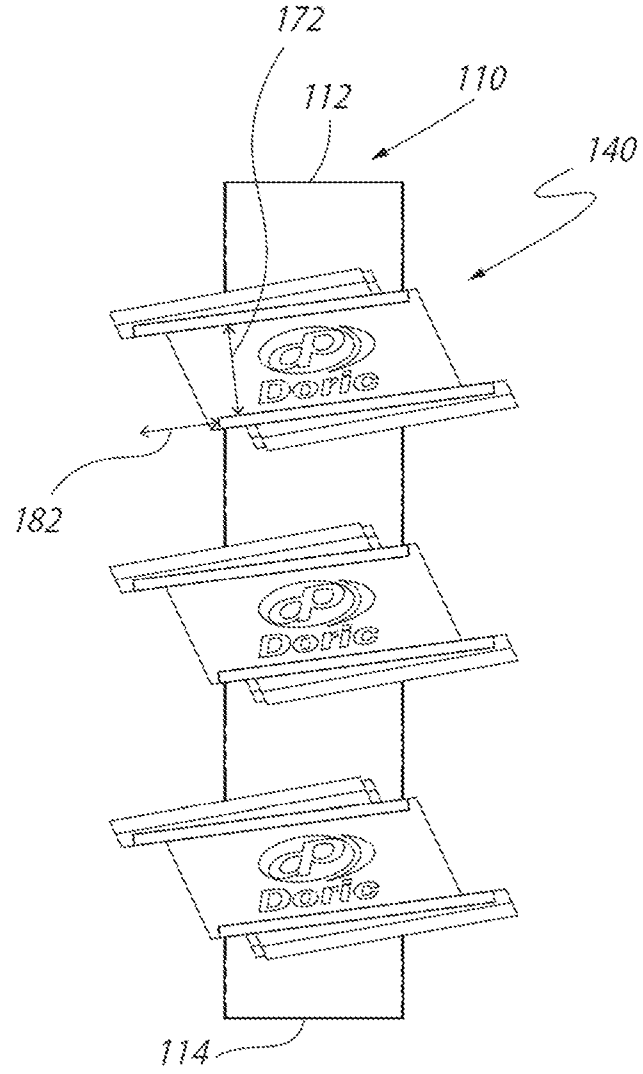
FIG. 3 is a detailed left section view of the louvre window of FIG. 1 in an open position.

Remaining with FIG. 1, each blade 140 has a first windowpane 160 fixedly attached to the blade 140 and a second windowpane 170 fixedly attached to the blade 140. Operation of the handle 130 causes movement of the link bars 122, which urges the pivot drive connector 150 to pivot, which urges the blades 140 to move between a closed position shown in FIG. 2 and an open position shown in FIG. 3. In the closed position, the first windowpanes 160 of the blades 140 are aligned to form a barrier against airflow through the window 100. Similarly, the second windowpanes 160 of the blades 140 are also aligned to form a barrier against airflow through the window 100. Being aligned, or in alignment, means being in appropriate relative position, which may be in a straight line, but could also mean the overlapping arrangement shown in FIG. 2. In the open position, the first windowpanes 160 are pivoted out of alignment to allow airflow through the window 100 and the second windowpanes 170 are pivoted out of alignment to allow airflow through the window 100. It should be noted here that the first windowpane 160 and the second windowpane 170 of each blade 140 are connected to a single blade 140 that is driven by a single pair of link bars 122.

The first windowpane 160 and second windowpane 170 of each blade 140 are offset in a first direction 170 by a first amount 172. The first windowpane 160 and second windowpane 170 of each blade 140 are also offset in a second direction 180 by a second amount 182. The first direction 170 is perpendicular to the second direction 180. The first amount 172 is greater than the second amount 182. Preferably, the first direction is normal to the first windowpane 160, preferably the second direction is parallel to the first windowpane 160. This allows the blades 140 to rotate with fixedly attached first and second windowpanes 160, 170 without collision of the windowpanes 160, 170. Each blade 140 also includes a cap member 190 between the first windowpane 160 and the second windowpane 170.

Figure 6:
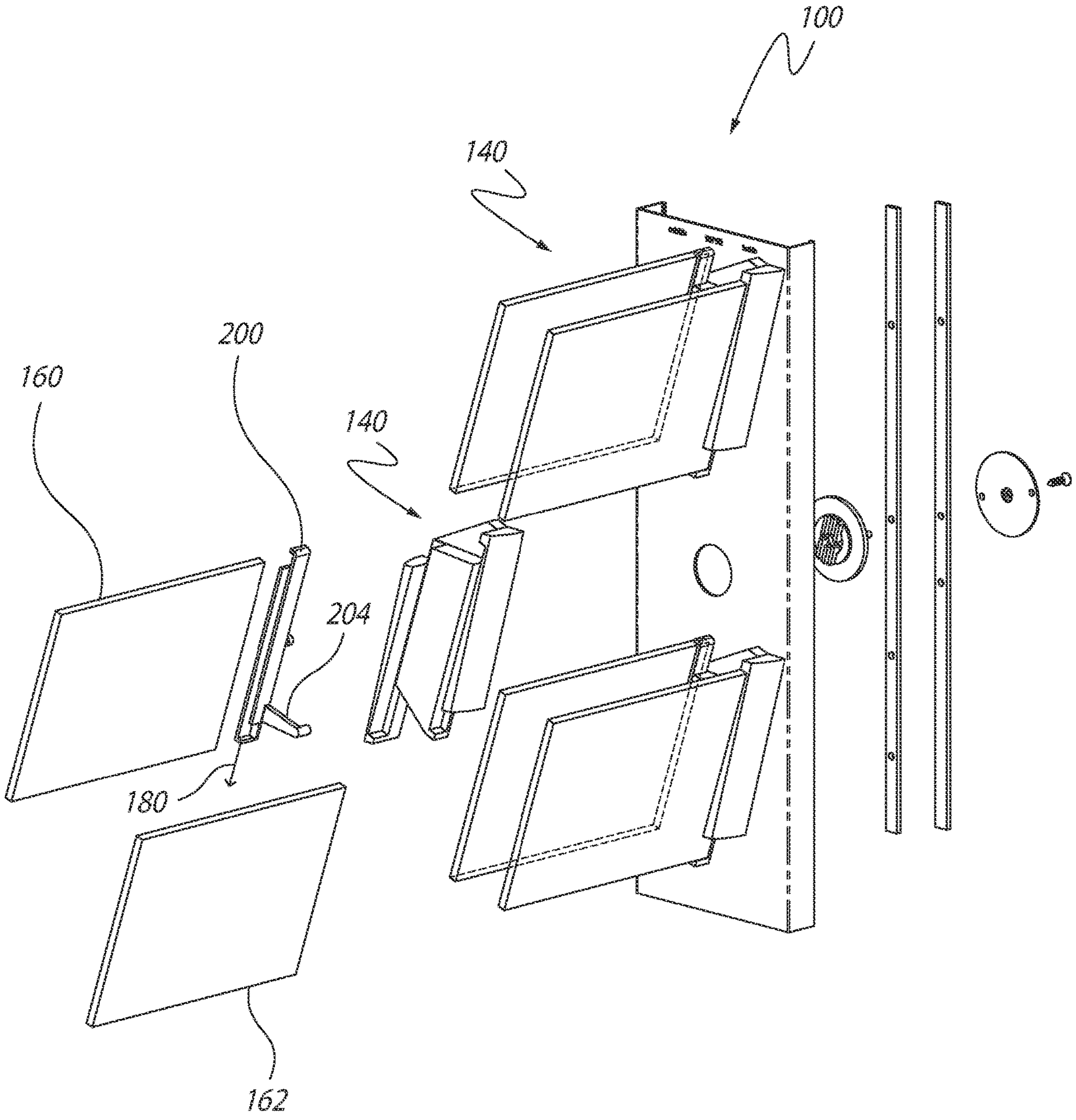
FIG. 6 is a detailed exploded view of a louvre window according to a second embodiment of the present invention.

Moving to FIG. 6, which shows a second exemplary embodiment of a louvre window 100 according to the present invention. It should be appreciated that the differing features between the louvre windows 100 of FIGS. 1 and 6 can be readily interchanged. They are simply presented separately to allow presentation of the mechanical concepts.

Figure 7:
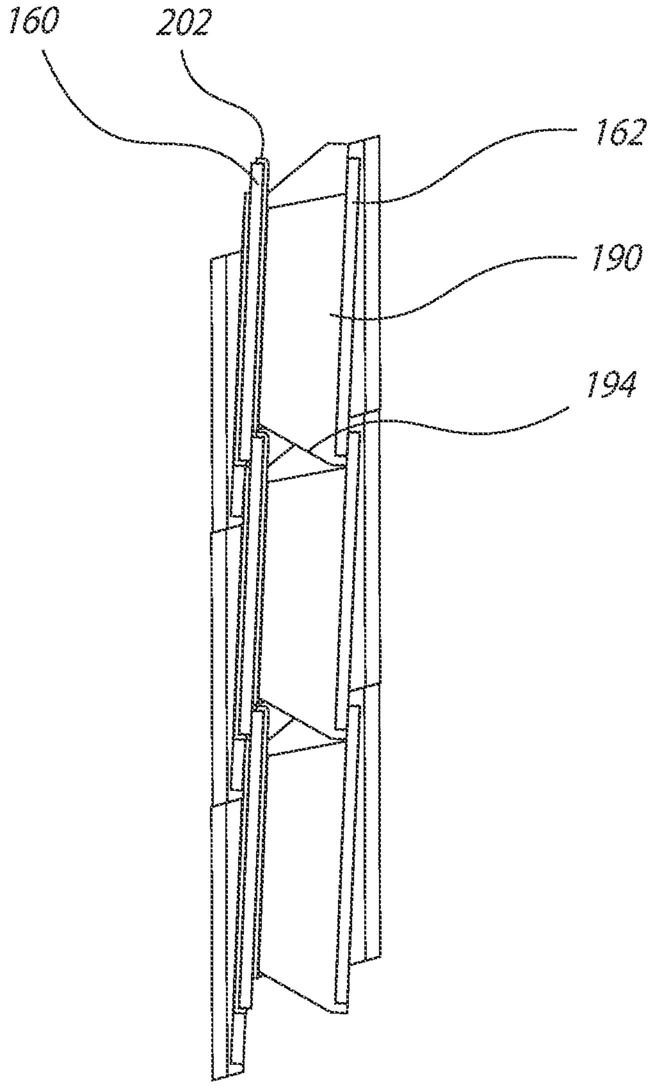
FIG. 7 is a detailed right section view of the louvre window of FIG. 6 in the closed position.

The louvre window 100 of FIG. 6 has blades 140 that further include a sliding member 200 to which the first windowpane 160 is attached, such that the sliding member 200 is between the first windowpane 160 and the blade 140. The sliding member 200 is mounted to be moveable in the second direction 180, so as to allow movement of the first windowpane 160 in the second direction 180. Referring now to FIG. 7, the sliding member 200 has an upper end 202 that extends over the first windowpane 160. Conversely, the cap member 190 has a lower end 194 extending below the second windowpane 170. Preferably, the lower end 194 of the cap member 190 has a sloped surface.

Figure 8:
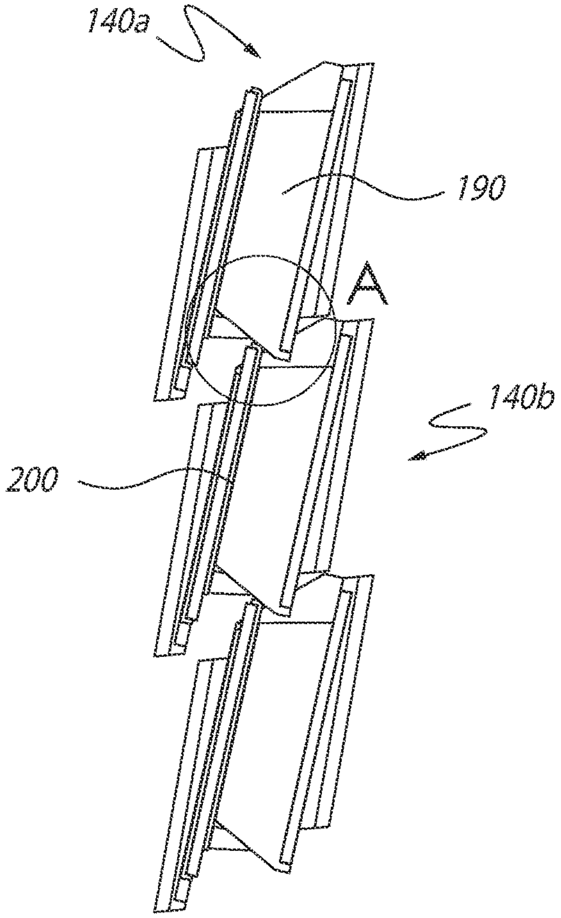
FIG. 8 is a detailed right section view of the louvre window of FIG. 6 between the closed position and the open position.
Figure 10:
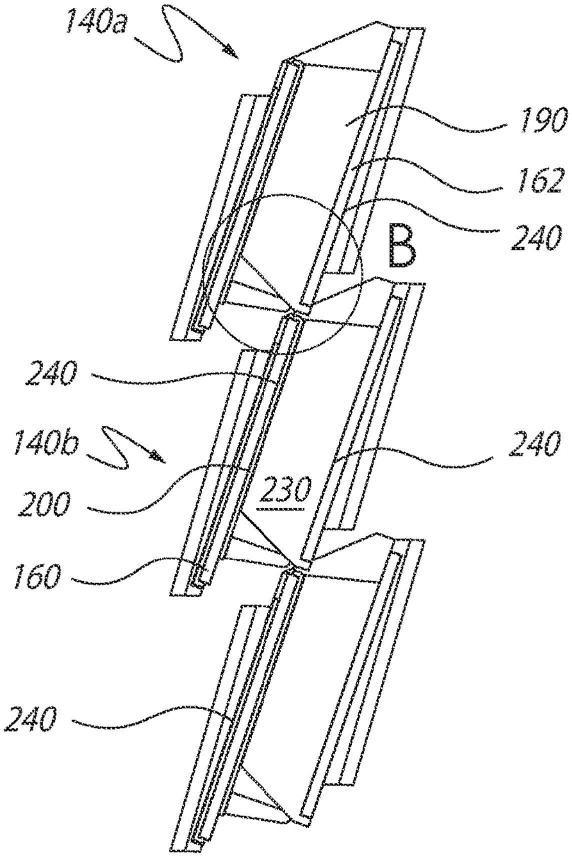
FIG. 10 is a detailed right section view of the louvre window of FIG. 6 in the open position.
Figure 9:
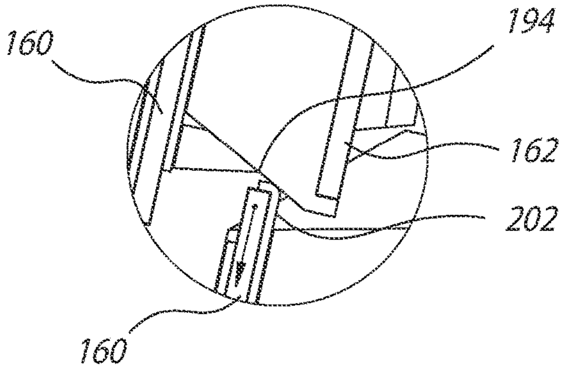
FIG. 9 is detail A of FIG. 8.
Figure 11:
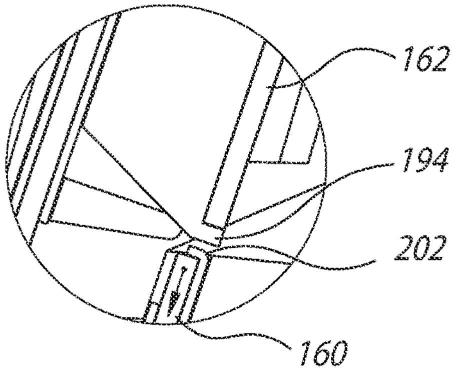
FIG. 11 is detail B of FIG. 10.

The result of this arrangement, as seen in FIG. 8, is that when the blade 140 is moved from the closed position of FIG. 7 to the open position of FIG. 10, the lower end 194 of the cap member 190 of an upper blade 140*a* abuts the upper end 202 of the sliding member 200 of a lower blade 140*b*. As the blades 140 are moved further towards the open position, the cap member 190 of the upper blade 140*a* urges the sliding member 200 of the lower blade 140*b*, and thereby the first windowpane 160 of the lower blade 140*b* downward in the second direction 180, as seen in FIG. 9. Once in the open position of FIG. 10, the lower end 194 of the upper blade 140*a* maintains alignment of the blades 140 by engagement with the upper end 202 of the lower blade 140*b*, as shown in FIG. 11. In the open position, the second windowpane 170 of the upper blade 140*a* is aligned with the first windowpane 160 of the lower blade 140*b* to form a channel 230 with substantially uninterrupted walls 240 to promote airflow.

Figure 12:
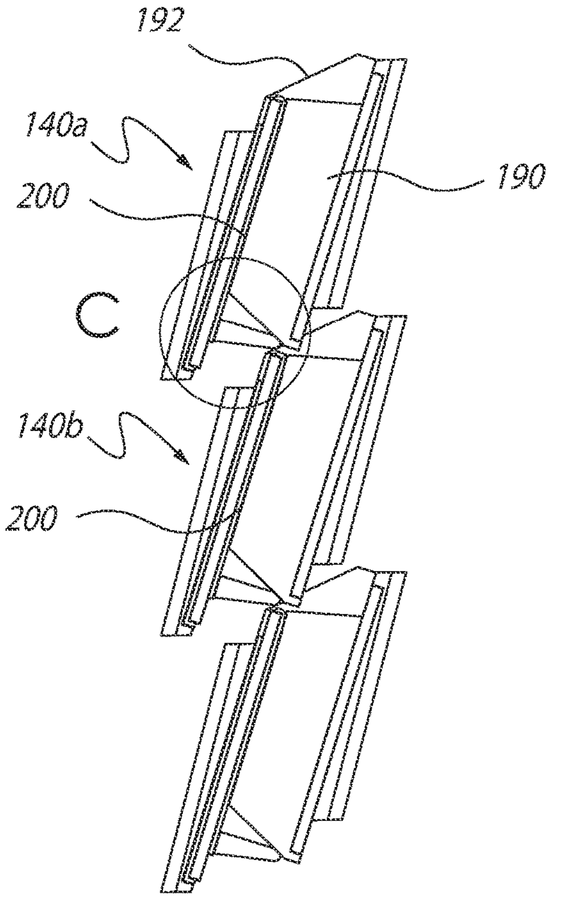
FIG. 12 is a detailed right section view of the louvre window of FIG. 6 between the open position and the closed position.
Figure 14:
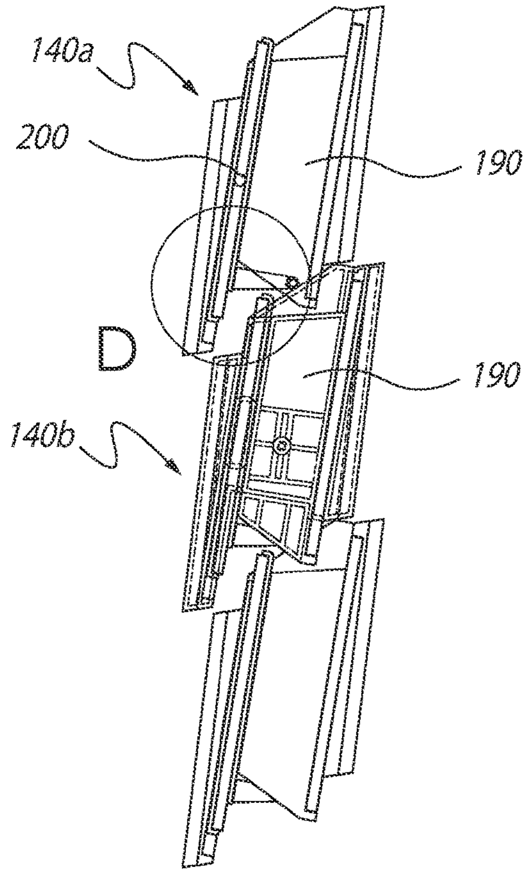
FIG. 14 is a detailed right section view of the louvre window of FIG. 6 between the open position and the closed position showing hidden detail.
Figure 13:
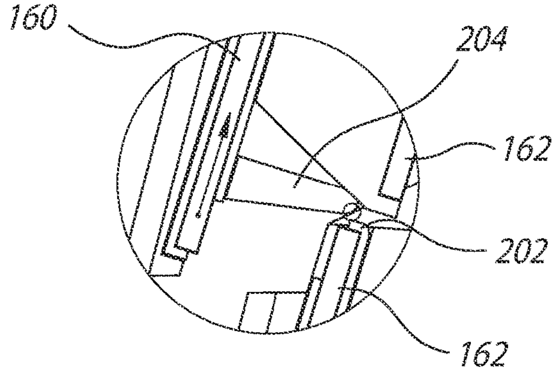
FIG. 13 is detail C of FIG. 12.

Briefly returning to FIG. 6, the sliding member 200 further includes a lower end 204 that extends toward the lower end 194 of the cap member 190. As shown in FIG. 12, when the blades 140 move from the open position of FIG. 10 toward the closed position of FIG. 7, the upper end 202 of the sliding member 200 of the lower blade 140*b* maintains separation with the upper blade 140*a* by abutting the lower end 204 of the sliding member 200 of the upper blade 140*a*.

Figure 15:
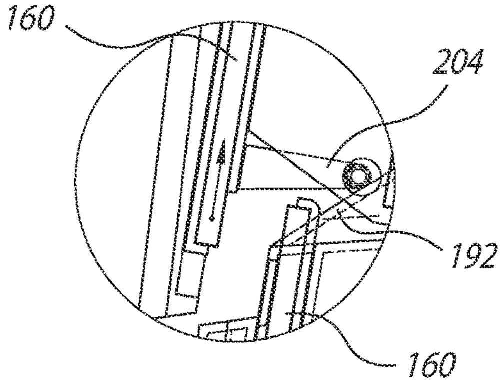
FIG. 15 is detail D of FIG. 14.

Moving to FIG. 12, the cap member 190 further includes an upper end 192 that extends above the second windowpane 170. Preferably, the upper end 192 is a sloped surface. As the blades 140 move further, the lower end 204 of the upper blade 140*a* engages the upper end 192 of the lower blade 140*b*, which causes the sliding member 200 of the upper blade 140*a*, and thus also the first windowpane 160 of the upper blade 140*a*, to be urged upwards in the second direction 180, as shown in FIG. 15.

Figure 16:
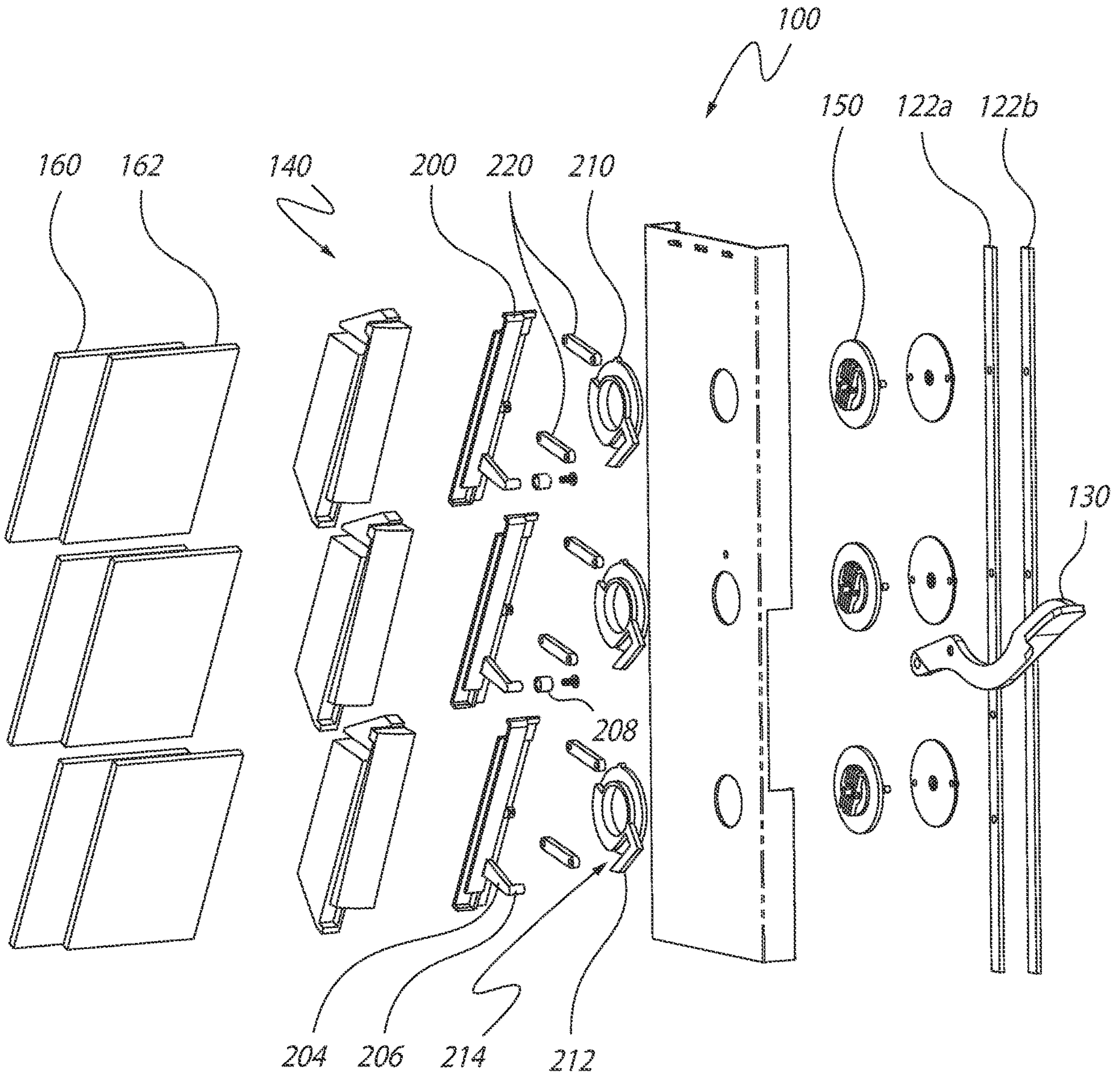
FIG. 16 is a detailed exploded view of a louvre window according to a third embodiment of the present invention.

FIG. 16 shows a third exemplary embodiment of a louvre window 100 according to the present invention. It should be appreciated that the differing features between the louvre windows 100 of FIGS. 1, 6, and 16 can be readily interchanged. They are simply presented separately to allow presentation of the mechanical concepts.

The louvre window 100 of FIG. 16 has blades 140 that each include a slide drive member 210 that pivots together with the pivot drive connector 150. The slide drive member 210 has an arm 212 that forms a recess 214 that pivots with the slide drive member 210. The pivot drive connector 150 in this embodiment is fixedly connected to the link bars 122.

In this embodiment the sliding member 200 is mounted to be movable in the first direction 170 and has a lower end 204 that extends in the second direction 180. The lower end 204 includes a drive boss 206 that is received by the recess 214 of the slide drive member 210. Preferably, the drive boss 206 includes a roller 208 to reduce friction between the slide drive member 210 and the sliding member 200.

Figure 17:
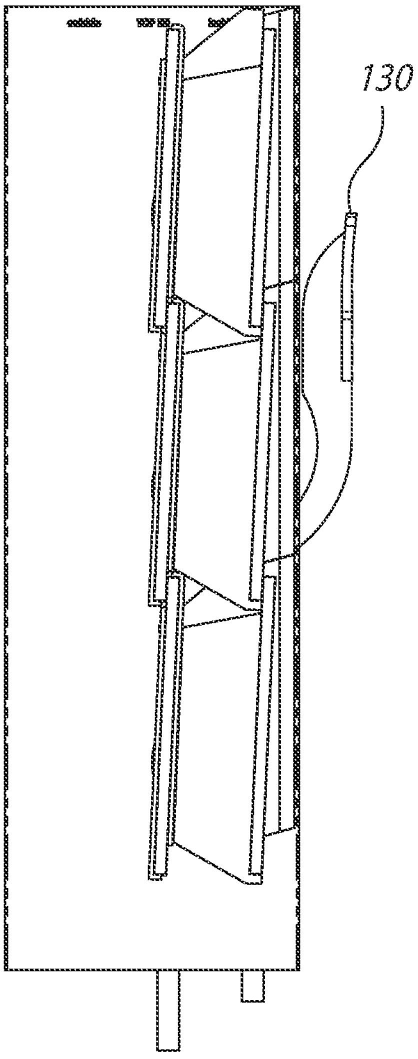
FIG. 17 is a detailed right section view of the louvre window of FIG. 16 in the closed position.
Figure 18:
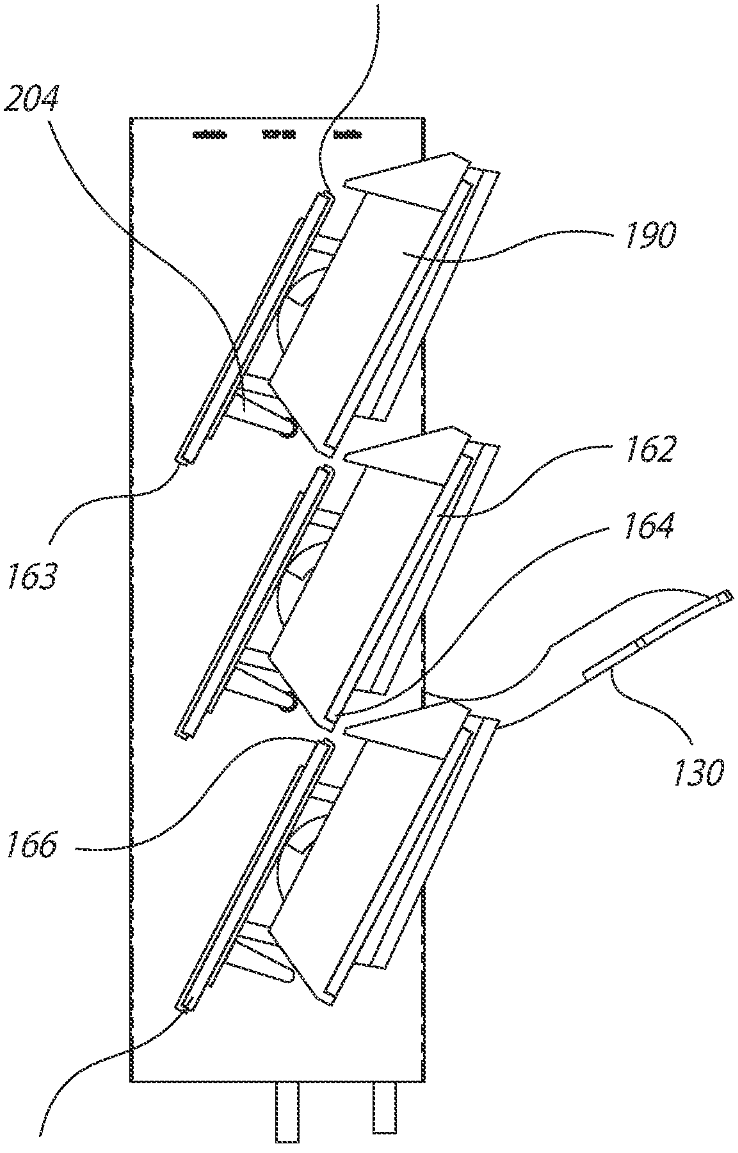
FIG. 18 is a detailed right section view of the louvre window of FIG. 16 between the closed position and the open position.
Figure 19:
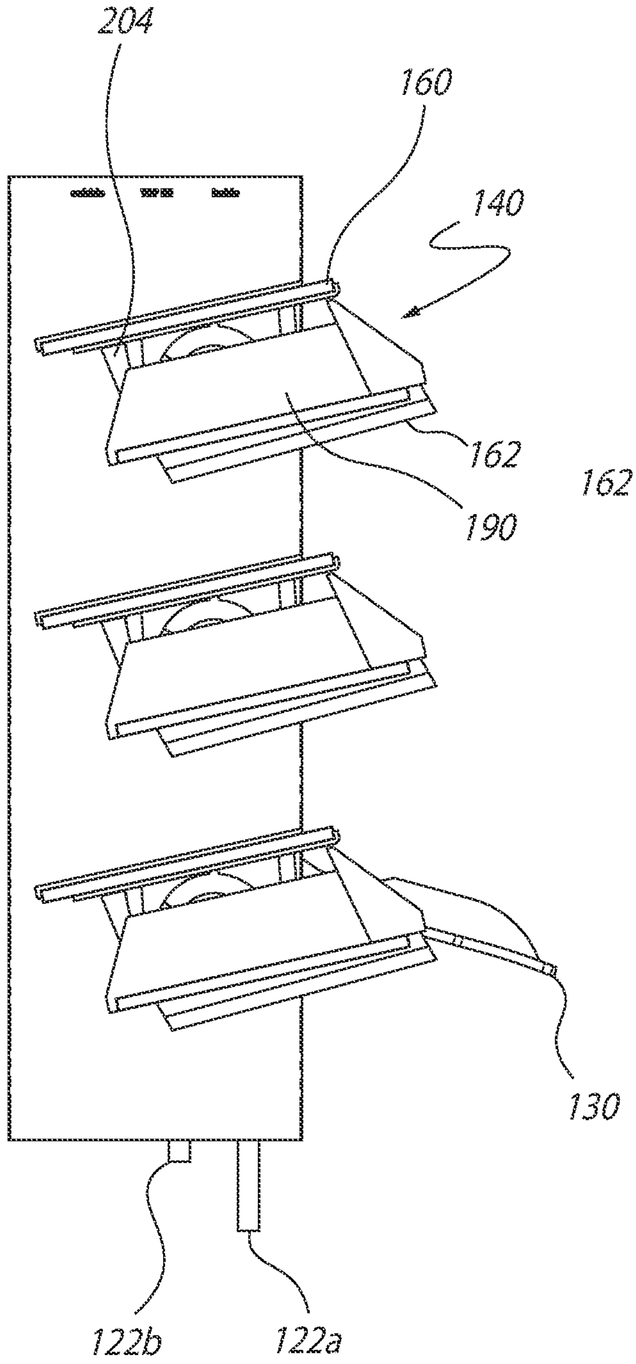
FIG. 19 is a detailed right section view of the louvre window of FIG. 16 in the open position.

As the blades 140 are driven by the handle 130 from the closed position, shown in FIG. 17, to the open position, shown in FIG. 19, the slide drive member 210 pivots and, due to the engagement of the drive boss 206 with the recess 214, urges the sliding member 200 in the first direction 170 to increase a distance between the first windowpane 160 and the second windowpane 170. More preferably, and as shown in FIG. 16, the sliding member 200 is attached to the respective blade 140 by at least two pivotable arms 220 to allow movement of the sliding member 200 in the first direction 170 and the second direction 180 in response to being urged by the slide drive member 210. The two-dimensional movement further increases a distance between a lower end 164 of the second windowpane 162 of the upper blade 140*a* and the upper end 166 of the first windowpane 160 of the lower blade 140*b*, thus allowing pivoting of the blades 140 up to and over degrees, between the closed and the open position.

Advantages of the louvre window 100 will now be discussed.

Because both the first windowpane 160 and the second windowpane 170 are drivable with a single handle 130 and a drive bar 120, movement of the blades 140 between the closed and open positions is simplified and improved. The use of the first and second windowpanes 160, 170 allows for creation of an insulating airgap between the windowpanes 160, 170 in the closed position, and substantially uninterrupted airflow in the open position, due to the small width of the single-glazed panes 160, 170. The use of the link bars 122 allows for simultaneous drive of multiple blades 140, while the use of the recesses 126, 128 allows for haptic feedback that the open and closed positions have been reached.

Offsetting the first and second windowpanes 160, 170 allows for pivoting of the blades 140 without causing collisions of the windowpanes 160, 170. The use of the cap member 190 improves the seal between the windowpanes 160, 170 and the blade 140, while also improving stability of the mounting of the windowpanes 160, 170 in the blade 140.

The use of the sliding member 200 allows the windowpanes 160, 170 to be offset as the blades 140 move between the open and closed position, which further decreases the footprint of the louvre window 100. The use of the sliding member 200 to maintain separation between the windowpanes 160, 170 assists in creation of the channel 230 and avoids damage to the windowpanes 160, 170 as a result of deflection due to airflow through the louvre window 100.

The slide drive member 210 allows the offset of the windowpanes 160, 170 to be driven within each blade 140, which reduces the dimensional and tolerance complexity of the louvre window 100 during manufacture and assembly. The use of the pivotable arms 220 to provide two-dimensional movement allows further offset to be created dynamically between the windowpanes 160, 170 as they move between the closed and open positions, allowing further rotation of the blades 140 and reducing the footprint of the louvre window 100. The use of the roller 208 reduces the force required to move the blades between the closed and the open position.

The creation of the channel 230 in the open position allows for substantially unhindered airflow driven by buoyancy through the louvre window 100. When used with tinted or frosted windows the alignment of the windowpanes 160, 170 also provides improved privacy.

| Integers: | |
|---|---|
| 100 | louvre window |
| 110 | frame |
| 112 | head |
| 114 | sill |
| 116 | jambs |
| 120 | drive bar |
| 122 | link bar |
| 124 | interior edge |
| 126 | upper recess |
| 128 | lower recess |
| 130 | handle |
| 140 | blade |
| 140a | upper blade |
| 140b | lower blade |
| 150 | pivot drive connector |
| 152 | boss |
| 160 | first windowpane |
| 162 | second windowpane |
| 164 | upper end |
| 166 | lower end |
| 170 | first direction |
| 172 | first amount |
| 180 | second direction |
| 182 | second amount |
| 190 | cap member |

-continued

| Integers: | |
|---|---|
| 192 | upper end |
| 194 | lower end |
| 200 | sliding member |
| 202 | upper end |
| 204 | lower end |
| 206 | drive boss |
| 208 | roller |
| 210 | slide drive member |
| 212 | arm |
| 214 | recess |
| 220 | pivotable arms |
| 230 | channel |
| 240 | walls |

We claim:

1. A louvre window having:

a frame, the frame having a head, a sill and at least two jambs;

a drive bar located in one or both of the jambs that is movable by a handle;

a plurality of blades located within the frame and connected to the drive bar by a pivot drive connector, such that movement of the drive bar urges the blades to pivot, each blade having:

a first windowpane attached to the blade; and a second windowpane attached to the blade, wherein operation of the handle causes movement of the blades between an open position and a closed position, wherein in the closed position the first windowpanes are aligned to form a barrier against airflow and the second windowpanes are aligned to form a barrier against airflow and in the open position the first windowpanes are pivoted out of alignment to allow airflow and the second windowpanes are pivoted out of alignment to allow airflow;

wherein the drive bar includes a pair of link bars and the pivot drive connector is connected to a respective link bar at opposite sides of the pivot drive connector such that differential translation of the link bars causes pivoting of the pivot drive connector; and wherein the link bars each have an upper and a lower recess for each pivot drive connector at an interior edge thereof, and the pivot drive connector has a boss that conforms to each recess, such that when the link bars are differentially translated, the boss releasably snaps into the upper recess of one link bar and the lower recess of the other link bar.

2. The louvre window of claim 1, wherein the first and second windowpane of each blade are offset in a first direction by a first amount, and wherein the first and second windowpane of each blade are offset in a second direction by a second amount, and wherein the first direction is perpendicular to the second direction and the first amount is greater than the second amount.

3. The louvre window of claim 1, wherein each blade further includes a cap member between the first and second windowpane.

4. The louvre window of claim 3, wherein each blade further includes a sliding member mounted to be movable in a second direction and to which the first windowpane is attached, the sliding member having an upper end extending over the first windowpane, and wherein the cap member has a lower end extending below second windowpane such that, when the blades move from the closed position to the open position, the lower end of the cap member of an upper blade abuts the upper end of the sliding member of a lower blade to urge the first windowpane of the lower blade in the second direction.

5. The louvre window of claim 4, wherein the sliding member further includes a lower end extending toward the lower end of the cap member such that, when the upper and lower blades move from the open position to the closed position, the upper end of the sliding member of the lower blade abuts the lower end of the sliding member of the upper blade to maintain separation between the second windowpane of the upper blade and the first windowpane of the lower blade.

6. The louvre window of claim 5, wherein the cap member has an upper end that extends above the second windowpane such that, when the upper and lower blades move from the open position to the closed position, the upper end of the cap member of the lower blade abuts the lower end of the sliding member of the upper blade to urge the first windowpane of the upper blade opposite the second direction.

7. The louvre window of claim 1, wherein each blade further includes a slide drive member that pivots together with the pivot drive connector, the slide drive member having a recess that pivots with the slide drive member, and a sliding member mounted to be movable in a first direction parallel to the first windowpane and having a lower end that extends in a second direction normal to the first windowpane as well as a drive boss received by the recess in the slide drive member, wherein, when the blades are driven from the closed position to the open position, the slide drive member pivots and thereby urges the sliding member in the first direction to increase a distance between the first windowpane and the second windowpane.

8. The louvre window of claim 7, wherein the sliding member is attached to the blade by at least two pivotable arm to allow movement of the sliding member in the second direction, such that the upper and lower blades are pivotable by about 90 degrees between the closed position and the open position.

9. The louvre window of claim 7, wherein the drive boss of the sliding member includes a roller to reduce friction between the drive boss and the recess of the slide drive member.

10. The louvre window of claim 1, wherein, in the open position, the second windowpane of an upper blade is aligned with the first windowpane of a lower blade to form a channel with substantially uninterrupted walls to promote airflow.

11. A louvre window having:

a frame, the frame having a head, a sill and at least two jambs;

a drive bar located in one or both of the jambs that is movable by a handle;

a plurality of blades located within the frame and connected to the drive bar by a pivot drive connector, such that movement of the drive bar urges the blades to pivot, each blade having:

a first windowpane attached to the blade; and a second windowpane attached to the blade, wherein operation of the handle causes movement of the blades between an open position and a closed position, wherein in the closed position the first windowpanes are aligned to form a barrier against airflow and the second windowpanes are aligned to form a barrier against airflow and in the open position the first windowpanes are pivoted out of alignment to allow airflow and the second windowpanes are pivoted out of alignment to allow airflow, wherein each blade further includes a slide drive member that pivots together with the pivot drive connector, the slide drive member having a recess that pivots with the slide drive member, and a sliding member mounted to be movable in a first direction parallel to the first windowpane and having a lower end that extends in a second direction normal to the first windowpane as well as a drive boss received by the recess in the slide drive member, wherein, when the blades are driven from the closed position to the open position, the slide drive member pivots and thereby urges the sliding member in the first direction to increase a distance between the first windowpane and the second windowpane.

12. The louvre window of claim 11, wherein the sliding member is attached to the blade by at least two pivotable arm to allow movement of the sliding member in the second direction, such that the blades are pivotable by about 90 degrees between the closed position and the open position.

13. The louvre window of claim 11, wherein the drive boss of the sliding member includes a roller to reduce friction between the drive boss and the recess of the slide drive member.

14. The louvre window of claim 11, wherein the drive bar includes a pair of link bars and the pivot drive connector is connected to a respective link bar at opposite sides of the pivot drive connector such that differential translation of the link bars causes pivoting of the pivot drive connector.

15. The louvre window of claim 11, wherein, in the open position, the second windowpane of an upper blade is aligned with the first windowpane of a lower blade to form a channel with substantially uninterrupted walls to promote airflow.

16. A louvre window having:

a frame, the frame having a head, a sill and at least two jambs;

a drive bar located in one or both of the jambs that is movable by a handle;

a plurality of blades located within the frame and connected to the drive bar by a pivot drive connector, such that movement of the drive bar urges the blades to pivot, each blade having:

a first windowpane attached to the blade; and a second windowpane attached to the blade, wherein operation of the handle causes movement of the blades between an open position and a closed position, wherein in the closed position the first windowpanes are aligned to form a barrier against airflow and the second windowpanes are aligned to form a barrier against airflow and in the open position the first windowpanes are pivoted out of alignment to allow airflow and the second windowpanes are pivoted out of alignment to allow airflow, wherein each blade further includes a cap member between the first and second windowpane, and wherein each blade further includes a sliding member mounted to be movable in a second direction and to which the first windowpane is attached, the sliding member having an upper end extending over the first windowpane, and wherein the cap member has a lower end extending below second windowpane such that, when the blades move from the closed position to the open position, the lower end of the cap member of an upper blade abuts the upper end of the sliding member of a lower blade to urge the first windowpane of the lower blade in the second direction.

17. The louvre window of claim 16, wherein the sliding member further includes a lower end extending toward the lower end of the cap member such that, when the blades move from the open position to the closed position, the upper end of the sliding member of the lower blade abuts the lower end of the sliding member of the upper blade to maintain separation between the second windowpane of the upper blade and the first windowpane of the lower blade.

18. The louvre window of claim 17, wherein the cap member has an upper end that extends above the second windowpane such that, when the blades move from the open position to the closed position, the upper end of the cap member of the lower blade abuts the lower end of the sliding member of the upper blade to urge the first windowpane of the upper blade opposite the second direction.

19. The louvre window of claim 16, wherein, in the open position, the second windowpane of an upper blade is aligned with the first windowpane of a lower blade to form a channel with substantially uninterrupted walls to promote airflow.

* * * * *